INVENTORS:
Arthur R. Greenwood
Walter W. Heinze
Edward Schnitta
David M. Boyd

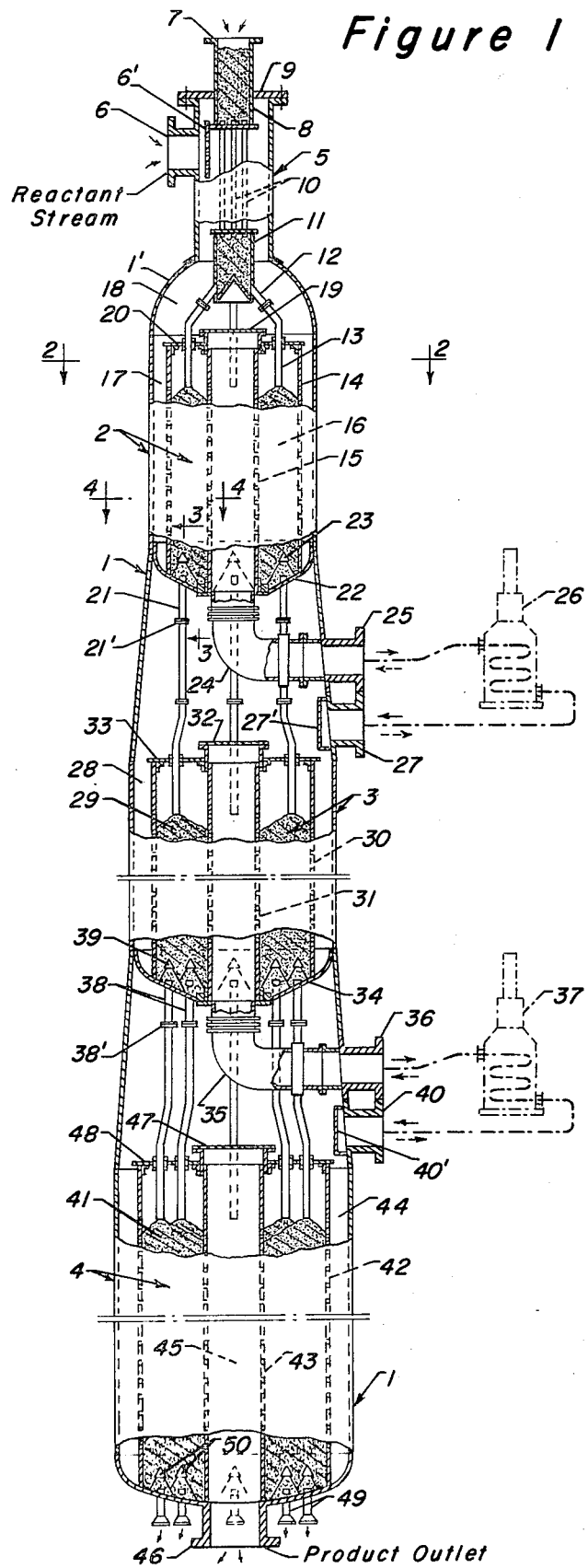
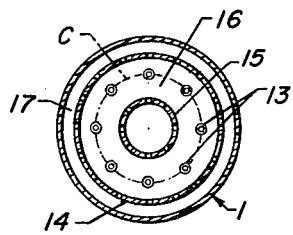
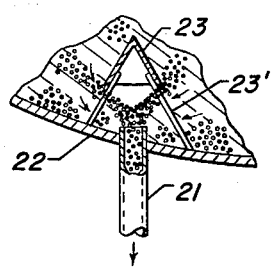
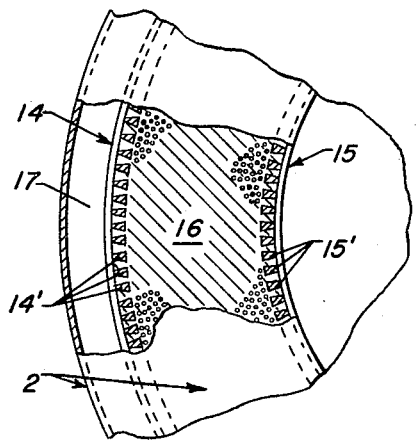

BY:

ATTORNEYS

United States Patent Office 3,706,536
Patented Dec. 19, 1972

3,706,536
MULTIPLE-STAGE STACKED REACTOR SYSTEM
FOR MOVING BED CATALYST PARTICLES
Arthur R. Greenwood, Niles, Walter W. Heinze, Chicago,
Edward Schnitta, Bensenville, and David M. Boyd,
Clarendon Hills, Ill., assignors to Universal Oil Products Company, Des Plaines, Ill.
Filed May 10, 1971, Ser. No. 141,514
Int. Cl. B01j 9/12
U.S. Cl. 23—288 G
9 Claims

ABSTRACT OF THE DISCLOSURE

A plurality of superposed reactor sections, with each having an annular-form catalyst section, are provided within a partitioned vertically elongated chamber such that catalyst particles can readily move by gravity from the upper section down through the lowermost section. Uniformly spaced apart small diameter catalyst transfer conduits provide for the downward movement of catalyst into and out of the chamber, as well as between adjacent sections in a manner to substantially preclude reactant stream flow between reactor sections through such conduits. Also, a preferred construction utilizes special flat faced, wedge-wire, to form the screening for retaining the catalyst in the annular-form catalyst zones and the flat-faced wires forming the screening are positioned vertically such that downwardly moving catalyst will not have to rub over a rough surface and be subjected to attrition.

Figure 5:
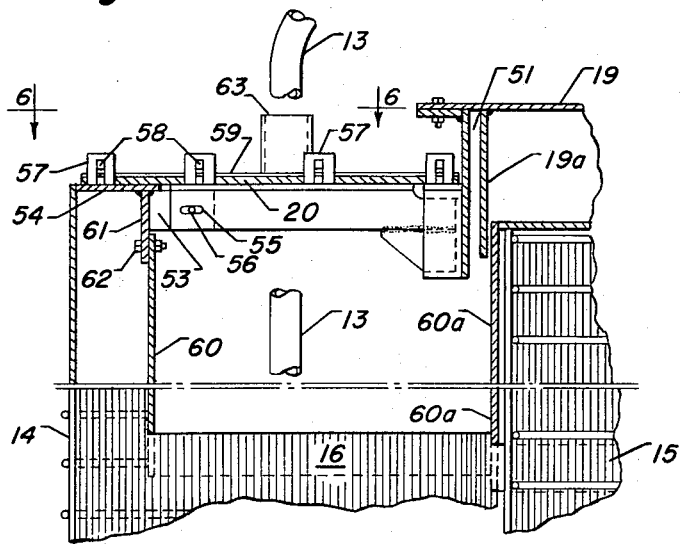

The present invention relates to a stacked reactor system for accommodating spherical-forming catalyst particles that are used for effecting the multiple-stage contacting of a vaporous or gaseous reactant stream.

More particularly, the improved apparatus arrangement provides for retaining downwardly movable catalyst particles in annular-form catalyst sections such that the reactant stream can flow laterally and radially through each section for optimum contacting conditions. The present unitary reactor system also utilizes unique type perforate screening to form the annular catalyst retaining section and special catalyst transfer means to insure uniform movement of catalyst particles from one contact zone to another as well as into and outwardly from the series of stacked reactor sections.

It is recognized that various types of conversion units have stacked catalyst contacting sections, however, these earlier constructions and arrangements have typically been involved with fluidized catalyst conversion units for cracking hydrocarbon vapors where a reactor section has been superposed over a regenerator section or a plurality of fixed bed catalyst layers have been retained in a common chamber without any means to move the catalyst serially from one bed to another.

It may be noted that the present multiple-stage reactor system is particularly adapted for use in carrying out a continuous operation for the catalytic reforming of a hydrocarbon feed stock, such as a naphtha fraction, where the catalyst is a platinum group metal combined with alumina spheres. Historically, catalytic reforming was first carried out, and still is frequently operated as a non-regenerative fixed bed type of process where catalyst is replaced in each reactor of the unit after six months, or one year or more, of continuous use. However, in more recent times a "swing" reactor, or extra reactor, has been utilized in a system to replace an "off-stream" reactor so that the catalyst bed in such reactor could be regenerated or replaced. In any event, prior reactor systems have not provided for the stacking of reforming reactors, nor have they made provision for having movability of catalyst by gravity from one annular-form reactor section to another. Actually, the catalyst is maintained in the unitary system and transferred from one section to another in such a manner that flow of particles can be continuous, at frequent intervals, or at long time intervals, with movement being controlled by the withdrawal of catalyst from the bottom of the stacked system.

One principal object of the present invention is to provide for the construction and arrangement of a plurality of stacked annular-form catalyst bed sections in a vertically elongated confined chamber. It may also be considered a major object of the invention to provide for the interconnection of catalyst sections in a manner such that there is, in effect, continuity of catalyst from an upper catalyst bed down through the system to a lowermost catalyst bed, whereby the withdrawal of catalyst from the bottom of the system causes simultaneous uniform downward movement of catalyst through all sections.

Another object of the present invention is to provide for the use of improved types of spaced screens, which define the annular-form catalyst sections and with each screen being constructed to have flat-faced wires extending vertically along the catalyst bed side in order to assist downward catalyst movement and minimize attrition in comparison with what would take place with conventional screening or perforated plate.

Still other objects and improved reactor construction aspects will be set forth hereinafter.

In a broad aspect the present invention may be considered to provide a multiple-stage catalytic reactor system for effecting the contact of a reactant stream with catalyst particles that are movable by gravity flow through said system, which comprises in combination; (a) a vertically elongated confined chamber; (b) at least two vertically spaced apart reactor sections in said chamber, with each such section in turn having therein concentrically spaced apart perforate screen wall members which provide an annular-form catalyst retaining section that is spaced inwardly from the wall of said chamber to additionally provide a manifold space around such section; (c) a transverse partition below each catalyst section and each reactor section to thereby separate adjacent sections; (d) removable cover means over the catalyst section in each of said reactor sections; (e) catalyst inlet means connective with the upper portion of said chamber and to the top of the upper annular-form catalyst section, (f) a plurality of uniformly spaced apart and elongated catalyst transfer conduits connecting between vertically adjacent catalyst retaining sections, whereby catalyst can move by gravity flow from an elevated reactor section to a next lower section and such conduits spaced in a circular positioning at both the upper and lower end portions of each such section that provides substantially half the retained catalyst be within the circle of conduits and approximately half the catalyst be outside of the circular positionings; (g) a reactant stream port means at the upper end of said chamber and passageway means to the annular space around the annular catalyst section of the uppermost reactor section; (h) additional reactant stream passageway means from the interior of each catalyst section and from below each reactor section connective with the annular space around a catalyst section of a next lower reactor section; and (i) a plurality of uniformly spaced apart catalyst outlet means provided from the lowermost reactor section and from said chamber.

Although not limiting, the present improved apparatus arrangement is particularly adapted for carrying out the catalytic reforming of a naphtha charge stream at conventional reforming conditions, such as briefly noted hereinbefore. Generally, the catalytic reforming of a hydrocarbon stream is effected with the use of a platinum containing catalyst, such as used in the various fixed bed type of units and such types of catalyst are well known to those skilled in the reforming arts. Typically, the catalysts are of a platinum-alumina-halogen composite and will be used in spherical form with a diameter being in the 1/32" to 1/8" range and preferably of a quite spherical form so as to provide free-flow characteristics that will not readily bridge or block the descending column or columns of catalyst through the system. In connection with the present improved apparatus arrangement utilizing a plurality of small diameter transfer conduits between catalyst beds in the stacked reactor sections, it is particularly important that the catalysts are of small diameter, preferably less than 1/8 of an inch, so as to enhance gravity flow from one section to another.

Although the apparatus is particularly useful for, and is directed to, catalytic reforming, it should be noted that such system might well be utilized to carry out other hydrocarbon conversion operations, such as desulfurization, hydrocracking, dehydrogenation, catalytic cracking, and the like, as well as chemical conversions not directly related to the conversion of petroleum feed stocks.

Inasmuch as it is desired to handle catalytic materials which are fragile in nature and can be subject to attrition, it is desirable that the concentric spaced apart perforate screen members comprise specially designed "screens," rather than use conventional woven screens or utilize perforate plate members. Thus, a preferred embodiment of the present improved apparatus will utilize special screens with flat-faced wires with in turn facing the interior of the resulting catalyst retaining section between the concentric spaced apart members. More specifically, each screen member will have vertical, parallel, flat-faced wires that are of wedge shape, as well as closely spaced so as to preclude the packing or loss of catalyst therebetween. The vertical orientation and the flat face for each wire of each concentric screen will permit the downward flow of catalyst in the catalyst bed section with a minimum of friction and with minimum attrition of catalyst particles. The flat faced, wedge-shaped wires forming the screen members also result in wedge-shaped openings between wires such that there is a resulting "non-clogging" type of screen whereby particulates that do pass between bars or wire members will flow on outwardly without being retained to block vapor flow through the annular-form catalyst sections.

It is also a particular feature of the present improved apparatus system to utilize a plurality of uniformly spaced apart, small diameter catalyst transfer conduits between the lower end of one catalyst section and the top of a next lower catalyst section, such that the catalyst can be permitted to move slowly from one reactor section to another; but there will be substantially no flow of reactant stream from one section to another through the small diameter pipe because the pressure drop through the catalyst filled pipe will equal the pressure drop through the external heater or other external equipment between reactor sections at the low flow rates. In connection with each of the transfer conduits, there is also provided a special cone-shaped catalyst deflector means spaced above the open inlet end so as to preclude the direct downward flow of catalyst thereto and instead cause a generally annular or lateral flow of catalyst into each transfer conduit. Typically in connection with an annular-form catalyst section, there can be the spacing of the conduits in a circle which will provide for a uniform downward flow of the entire annular-form catalyst bed from any one reactor section. With a relatively thin annular-form catalyst section, a single row of spaced apart transfer conduits will in turn be positioned concentrically with respect to the catalyst section such that half the volume of the catalyst is inside of the circle of transfer conduits and half is outside of the circle in order to optimize uniform flow from, and into, transfer conduits with respect to the annular bed.

With respect to the reactant stream, separate outlet means is provided from the lower end of each reactor such that the resulting contacted stream may be passed directly to the next section or chamber whereby there may be reheating (or cooling) of the stream. In the latter instance a separate reactant stream inlet means is provided between each reactor section such that there may be the reintroduction of the stream to the system and to the exterior of the catalyst retaining section of the next lower reactor section. In other words, there is generally or preferably a radial flow from the outside of the annular-form catalyst bed to the interior thereof and a withdrawal of the contacted stream from the inner of the concentric catalyst retaining screens. Of course, where desired, the apparatus can be used to have an upward flow and/or an in-to-out reactant flow. In any event, since a radial flow is desired, it is required that each catalyst section have cover means to preclude a downward flow into each bed. Also, where necessary for low catalyst levels, there may be special perforate skirt means, or baffle means, around each annular-form catalyst bed such that the reactant stream will not pass over the upper portion of a catalyst bed and be by-passed directly down into a reactant stream withdrawal zone.

Still other improved construction features, such as expansion joint means in connection with reactant stream conduits, means for accommodating expansion of concentric catalytic screens, means for holding catalyst section cover plates, means for distributing and regulating reactant stream flow, and the like, will be set forth in more detail hereinafter. It should be further noted that the present apparatus system provides, in connection with the upper catalyst inlet zone, that a removable tubular-form heat exchanger can provide for the downward flow of subdivided catalyst particles in indirect heat exchange relationship with the reactant stream that is flowing through the upper end of the uppermost reactor section. This special catalyst inlet arrangement provides for the flow of catalyst particles into a distributor box or container which in turn redistributes into a plurality of spaced apart depending small diameter catalyst transfer conduits that discharge into the upper end of the uppermost annular-form catalyst section and, at the same time, there are a plurality of small diameter pipes or conduits used to transfer catalyst into the distributing container that can provide for indirect heat exchange with a relatively high temperature inlet reactant stream. This arrangement is of particular advantage where there has been a hydrogen lift of regenerated catalyst to the top of the stacked reactor system and there can be a resulting reduction of the catalyst particles, as well as preheating of catalyst, by an external temperature of 900° F., or more, from the reactant charge stream.

Reference to the accompanying drawings and the following descriptions thereof will serve to better illustrate the improved multiple-stage stacked reactor system of the present invention as well as permit more detailed description of various portions of the overall apparatus arrangement. Also, additional advantageous features in being able to carry out a continuous moving bed operation with movable spherical-form catalyst particles will be described in connection with the drawings.

FIG. 1 of the drawing is a diagrammatic sectional elevational view through an embodiment of the improved type of unitary, multiple-stage stacked reactor system, in accordance with the present invention.

FIG. 2 of the drawing is a sectional plan view through an upper portion of the reactor unit, as indicated by line 2—2 in FIG. 1.

FIG. 3 of the drawing is a partial sectional view through an upper portion of a catalyst transfer conduit and an inverted cone deflector member, in accordance with line 3—3 in FIG. 1.

FIG. 4 of the drawing is a partial sectional plan view showing the preferred type of concentric screen members which form the catalyst retaining sections in each reactor section, in accordance with line 4—4 in FIG. 1.

FIG. 5 of the drawing is a somewhat enlarged partial sectional elevational view through the cover means used at the top of each annular-form catalyst retaining section.

Figure 6:
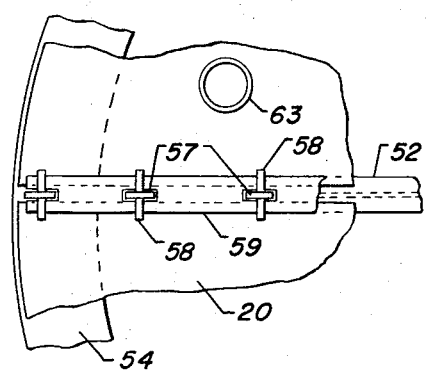

FIG. 6 of the drawing is a partial sectional plan view indicating the hold-down of adjacent cover plate means for a catalyst retaining section, such as indicated by the line 6—6 in FIG. 5.

Figure 7:
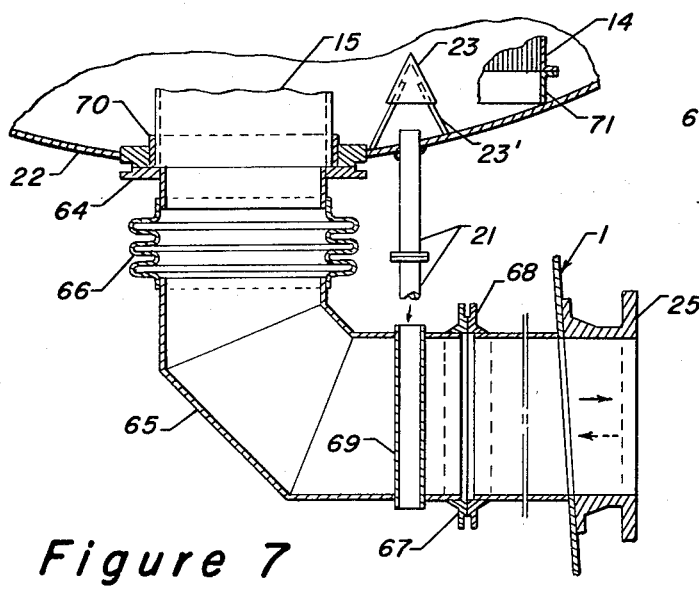

FIG. 7 of the drawing is a sectional elevational view indicating expansion joint means in the reactant stream withdrawal conduit means from a catalyst retaining section.

Figure 8:
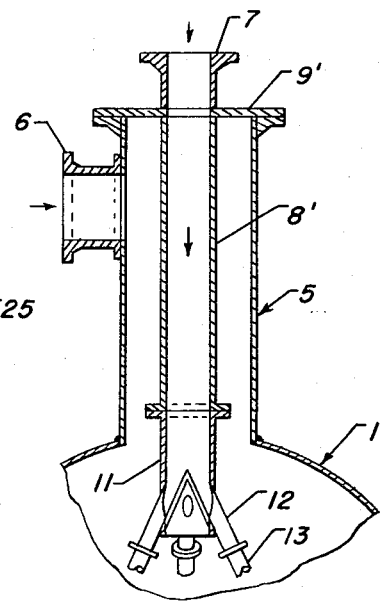

FIG. 8 of the drawing indicates, in a partial sectional elevational view, a provision for introducing catalyst to the top of the system in an optional construction eliminating the tubular heat exchange arrangement shown at the top of FIG. 1.

Figure 9:
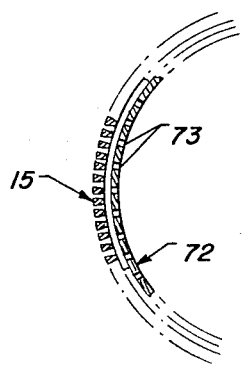

FIG. 9 of the drawing shows, in a partial sectional view, the use of a cylindrical perforated plate in combination with the inner screen member to distribute reactant stream flow through each bed and through the unit.

Referring now particularly to FIG. 1 of the drawing, there is shown an elongated vertically oriented chamber or housing 1 which, in the present embodiment, encloses three vertically stacked reactor sections generally indicated at 2, 3 and 4. At the upper end of the unit, above reactor section 2 and head 1', is a heat exchange section 5 having a reactant stream inlet port or nozzle 6 and a catalyst inlet port 7. The latter leads into a catalyst inlet section 8 suspended from a flange 9 to permit the redistribution of the catalyst entering at 7 to pass through a plurality of tubes 10 in heat exchange relationship with the reactant stream entering by way of port 6. The tubes 10 in turn discharge into a catalyst redistribution section 11 which has a plurality of uniformly spaced apart outlets 12 in turn connecting with transfer conduits 13. It will be noted that the charge stream from inlet 6 will pass around and in direct heat exchange with conduit means 10 such that where the charge stream is at a high temperature there can be a preheating and reduction of catalyst being transferred into the unit. For example, as hereinbefore noted in connection with the catalytic reforming of a naphtha charge stream through the use of a platinum containing catalyst composite, as well as with the reaction being carried out in the presence of hydrogen, there can be the introduction of the catalyst into inlet 7 and into tubes 10 in the presence of hydrogen whereby there is resulting reduction of the catalyst, or at least further reduction of the catalyst, and catalyst heating, by virtue of the charge stream being at 900° to 1000° F. or more.

In accordance with the present invention, the upper reactor section 2 is provided with spaced concentric screen members, 14 and 15 respectively, to thereby define an annular-form catalyst retaining section 16. It will also be noted that there is an outer annular-form vapor distributing zone 17 around the full height of the outer concentric screen 14 whereby there is a resulting radial inward flow of the charge stream passing from inlet means 6 to the upper passageway 18 in head 1' and thence into the distribution zone 17. In order to preclude the by-passing of the reactant stream from the passageway section 18, there are cover plate means 19 and 20 over respectively at inner concentric screen member 15 and above the catalyst bed section 16.

Also, in accordance with the preferred embodiment of the invention, and as best shown in FIG. 2 of the drawing, there are a plurality of the spaced conduit means 13 to effect the uniform transfer of catalyst from distribution section 11 down to the annular-form catalyst bed 16. The number of transfer conduits utilized will, of course, depend on the diameter of the reactor section being constructed and used to contact the charge stream. Preferably, the bed section 16 between cylindrical screens 14 and 15 will be relatively narrow so as to minimize the pressure drop for the charge stream passing radially through the catalyst bed to the interior of screen member 15. Thus, generally, a single circular orientation of transfer conduits 13 will suffice for the uniform distribution of catalyst into the bed section. It may be noted, however, that a preferred positioning arrangement for conduit members 13 will be in a circular orientation along a circle, indicated as C, which is spaced with respect to screens 14 and 15 in a manner to discharge catalyst downwardly in a manner whereby approximately half the catalyst within bed 16 will be outside of the circle C and the other half within the circle C.

In a similar manner, open-ended transfer conduit means 21 are provided from the lower end of the reactor bed section 16 and from a lower head or partitioning means 22 such that there may be a transfer of catalyst particles from the annular-form catalyst bed 16 in reactor section 2 into a next lower catalyst section within reactor section 3. However, as best shown in FIG. 3 of the drawing in connection with each transfer conduit 21, there will be a superposed inverted cone member or baffle member 23, held by rods 23', to provide for the deflection of catalyst particles from a direct descent into the open upper end of each conduit member 21. In other words, catalyst particles will be caused to flow around the lower flared portion of cone 23 and thence angularly, or laterally into the top of each transfer conduit 21. This arrangement provides for a generally downward uniform movement of all catalyst particles within the catalyst bed, without leaving any large zones or pockets of undisturbed particles. With $\frac{1}{16}''$ diameter catalyst particles, it has been found that transfer conduits 21 may be spaced approximately 2 feet apart and still permit fairly substantial uniform flow of all catalyst from a superposed annular-form bed; however, the spacing between individual transfer conduits 21 will depend upon the thickness of the annular-form bed and the flow characteristics of the particles comprising the particular bed.

Within chamber 1 between reactor sections 2 and 3, as well as below transverse partition or head means 22, there is indicated a reactant stream withdrawal conduit 24 which communicates with an outlet port 25. The latter is shown as being connected (in a diagrammatic manner) with an intermediate heater means 26 such that there may be a reheating of the reactant stream from reactor section 2 prior to reintroduction into reactor section 3. In other words, the reactant stream withdrawal from port 25 after heating can be reintroduced by port means 27 into the interior of chamber 1 for distribution into outer annular section 28. From the latter, there will be the radial inward flow through catalyst section 29 provided between concentric screen members 30 and 31.

Actually, the construction and arrangement of reactor section 3 will be similar to that of reactor section 2 in that a central or interior screen means 31 will have a cover plate 32 and additional cover means 33 will extend across the top of annular catalyst zone 29 to preclude any direct overhead inlet flow of reactant stream into catalyst section 29. Also, the lower end portions of transfer conduits 21 can be uniformly spaced in a circle between screens 30 and 31 to permit the resulting substantially uniform flow of catalyst particles to bed 29 from reactor section 2.

The construction of the lower end of reactor section 3 is similar to the lower end portion of reactor section 2 in that a transverse head or partition member 34 provides for the support of concentric screens 30 and 31 and precludes the downward passage of the reactant stream from reactor section 3 except by way of conduit 35 which is in open communication with the interior of inner screen member 31. There is also indicated the connection of conduit means 35 with outlet port 36 which is shown connecting (in a diagrammatic manner) with inter-heater means 37.

With respect to catalyst transfer means from bed 29, there is indicated a plurality of small diameter catalyst transfer conduit means 38 extending through head means 34 into a lower end portion of the catalyst retaining section 29. As previously described in connection with transfer conduits 21, the plurality of conduits 38 are preferably uniformly spaced apart in a circular arrangement to permit the uniform withdrawal of catalyst particles from section 29 and in turn permit particle passage down into the next lower reactor section 4. Also, in accordance with the preferred construction of the system, and as best provided by the present invention, there shall be an inverted cone member 39 above each open end portion of each transfer conduit means 38 so as to provide for substantially uniform withdrawal of all catalyst from catalyst bed section 29, without leaving pockets or unused catalyst as set forth in connection with cones 23 and transfer conduits 21.

The reactant stream withdrawal from transfer conduit means 35, or from outlet means 36, is indicated as being introduced back into the chamber 1 by way of port means 40; and, in a manner similar to the reactor section 3, there will be a reintroduction of the reheated reactant stream into the upper portion of reactor section 4 whereby there can be the next successive stage of catalyst contact by particles retained in annular-form bed 41. The latter, in a manner similar to the arrangements of reactor sections 2 and 3, will utilize concentric screen members 42 and 43 to define the bed and to permit the desired passage of the reactant stream in a uniform radial inward flow from distributing zone 44 to inner zone 45. Inasmuch as the latter is a collection zone for the last stage of contact indicated, there is a direct connection between zone 45 with outlet port means 46. Although not shown in the present drawing, the latter may connect by suitable transfer conduit means with product recovery apparatus or with a still next successive stage of catalyst contact.

The aforegoing description sets forth a downflow and inward radial flow for the reactant stream. However, the apparatus and catalyst beds are well adapted to accommodate a bottom to top flow and an in-to-out flow through the catalyst beds.

Above the upper end portion of inner concentric screen member 43, there is a cover plate means 47 to preclude the direct passage of the reactant stream into collection zone 45. Also, in a manner similar to the upper portions of reactor sections 2 and 3, there will be cover plate means 48 above catalyst section 41 to preclude downward flow of the reactant stream into the catalyst bed. Also, in connection with catalyst flow or transfer into reactor section 4, there will be the uniform spacing and positioning of the lower ends of the plurality of conduit means 38 within the upper portion of catalyst section 41 whereby catalyst is permitted to move by gravity into such section in a uniform manner, and at locations where approximately one-half the catalyst bed is within the circle of conduits and one-half outside the circle of conduits. Still further, in a manner similar to the lower end portions of reactor sections 2 and 3, there will be the uniform positioning and spacing of a plurality of catalyst outlet conduits, or outlet ports 49, as well as a plurality of catalyst deflector means 50 used in combination with open end portions of outlets 49, such that there may be the uniform withdrawal of catalyst from the lowermost zone of the multiple reactor system.

In a preferred construction, as best shown by FIG. 4 of the drawing, for both the inner and outer concentric screen members which define a catalyst retaining section, such as 16 for reactor section 2, there is a special construction and arrangement for each screen member 14 and 15 that will provide flat faced wires or rods in vertical positioning to face the catalyst in the annular-form bed provided between the two concentric screens. In other words, as shown diagrammatically in FIG. 4 for screen 14, there are a multiplicity of closely spaced vertical wires or bars 14′ which have a wedge shape, with each having a flat face to be along the inner face or periphery of screen 14. This results in a minimum of attrition with respect to catalyst particles which will be moving downwardly by gravity during the use of the apparatus. Similarly, screen member 15 will utilize a multiplicity of flat-faced wedge-shaped wires or bars 15′ to in turn face outwardly toward the catalyst being retained in bed 16 such that there is a relatively smooth face to be in contact with the movable particles in bed 16. The vertical orientation of the bars or wires, as well as the smooth flat faces, will minimize friction and attrition with respect to the catalyst particles as hereinbefore set forth. The spacing between bars will, of course, be something less than the diameter of the particles being used in the system. Thus, for $\frac{1}{16}''$ spherical particles, the spacing between bars will be approximately $\frac{1}{32}$ inch or at least something less than $\frac{1}{16}''$.

In order to illustrate the utility of the stacked reactor system as indicated in FIG. 1 of the drawing, it may be presumed, by way of illustration, that a straight run gasoline fraction boiling in the 200–400° F. range is being charged to the system by way of inlet 6 in admixture with a hydrogen-rich recycle stream such that there may be catalytic reforming of such stream in the presence of a suitable spherical-form reforming catalyst which is in turn introduced by way of inlet 7 to the top of the system. It may also be presumed that the catalyst particles entering inlet 7 will be in the presence of hydrogen which is utilized to provide a fluidized lift for such particles from fresh catalyst storage means or from suitable regenerator means. Thus, with the charge stream entering inlet 6 and being deflected by baffle means 6′, there is an indirect heat exchange, in the approximate 900° to 1100° F. range with the charge stream passing around the catalyst containing conduits 10. Catalyst which is heated and reduced in tubes 10 is distributed from section 11 down into tubes 13 and thence into catalyst zone 16 where there is contact with the reactant stream as heretofore described.

Inasmuch as the overall reforming reaction is endothermic, there is preferably a reheating of the reactant stream prior to being introduced into reactor section 3; and as shown by the diagrammatic illustration of inter-heater 26, there can be the reheating of the charge stream to a desired level of the order of about 900° F., or more, and then a reintroduction into chamber 1 at inlet means 27 around baffle means 27′ and into annular-form distribution zone 28. The latter provides that there is a radial inward flow through catalyst section 29 within reactor section 3 in a manner similar to that provided by reactor section 2. The reactant stream from the second stage of catalyst contact will be withdrawn by way of conduit 35, transferred to inter-heater means 37 and then reintroduced into the system by way of inlet port 40 at a desired temperature level. Again there will be the redistribution of the reactant stream into the system through inlet 40 and around baffle means 40′ to reach annular-form distribution zone 44 for subsequent contact with reactor bed 41. Again the flow is radially inward so as to provide low pressure drop contact with the catalyst particles and collection of the contacted stream in an inner concentric screen member at zone 45. The latter provides for the discharge into outlet opening 46.

Actually, it will be seen that the reactant stream flow can carry through the multiple stages of contact in a continuous manner and undergo very little pressure drop. Also, it will be noted that by virtue of the use of small catalyst transfer conduits, such as conduits 21 and 38 between stacked reactor sections, there will be substantially no direct reactant stream flow between annular-form catalyst beds. In other words, the reactant stream between reactor sections will be by way of the larger low pressure drop transfer conduits rather than through small, high pressure drop conduits. Of course, where reheating means is not necessary in a particular process, there may be the direct passage of the reactant stream from an upper reactor section to a next lower reactor section without the need of conduit means and port means to carry the reactant stream exteriorly of chamber 1. Also, as heretofore set forth, there may be a reverse, or bottom-to-top flow, in accordance with the dashed arrows shown in FIG. 1.

It should be pointed out that the catalyst within the multiple-stage reactor system can be retained in each section for relatively long periods of time without movement; however, by virtue of the present construction, it will be seen that the catalyst may be moved continuously, or at short intervals of time, to insure maintaining fresh catalyst, or reactivated catalyst, within the system. Actually, there is a continuity of catalyst particles from the lowermost reactor section up through transfer conduit means 38 to catalyst section 3 and thence upwardly through transfer means 21 into reactor section 2, as well as continuity through transfer conduits 13 into distribution means 11, tubes 10 and inlet means 8. As a result, the withdrawal of catalyst from outlet means or ports 49 will mean that there is a movement of catalyst through all of the superposed reactor sections and transfer conduit means and the regulation of movement in the system is controlled by the withdrawal means below outlet ports 49.

Referring now to FIG. 5 of the drawing, there is illustrated one desirable form of construction system for the attachment of cover plates over the upper end of each catalyst bed section, as well as above each inner concentric screen member. Specifically, there is indicated for the upper end portion of reactor section 2 a cover plate 19 over a flanged cylinder section 51 which has a plurality of cantilevering bracket means 52. The outer end of each of the latter members connects with a bracket 53 which in turn connects with an inwardly flanged section 54 at the top of outer concentric screen member 14. Inasmuch as there may be outward radial expansion of each member 52 with respect to each of the bracket means 53, there is indicated the use of a slotted opening 55 around each bolt means 56. Also there is indicated a depending skirt member 19a to provide a guide means around the top portion of inner screen 15.

As best shown in FIG. 6 of the drawing, there is a plan view of one of the plurality of the outwardly extending bracket members 52 which are spaced circumferentially around cylindrical member 51 in order to hold or support a plurality of pie-shaped cover members 20. In other words, bracket members 52 may be of a T-form in order to have a flat top support for the radial edge portions of adjacent cover plates 20. At the same time the horizontal flange portion 54 from the upper end of screen member 14 will support the outer circumferential edges of each cover plate 20. Plates 20 may be bolted to the bracket member 52; however, because of high temperature conditions, it is preferred that hold-down means other than bolts are utilized in attaching the cover plates to the upper end of each reactor section. In this instance, there are shown a plurality of upwardly extending hoop members 57 from the top face of each T-member 52 which will accommodate wedge members 58 that can rest over a hold-down strip 59 that in turn will lap over edge portions of adjacent cover plates 20. Thus, when it is desired to remove plates 20 from above the top of the catalyst bed section 16, there may be the knocking loose of each of the wedge members 58 from above the hold-down strip 59 (rather than a loosening of a plurality of bolt members) to provide for the lifting and removal of the various cover plates 20.

There is also indicated in connection with FIG. 5 of the drawing, the provision of depending baffle plates 60 and 60a which are shown, respectively, spaced concentrically just inside of the outer screen member 14 and just outside of screen 15 to serve as deflectors for the inwardly flowing reactant stream in connection with a particular catalyst bed height within the reactor section. Deflector plate 60 is shown depending from a short holding ring 61 and attached thereto by removable bolt means 62 such that various lengths of cylindrical baffles may be utilized within any one reactor section. Also covering screen 15 and hanging as a skirt therearound is the baffle 60a which can have varying lengths. Thus, at the lower edge portions of members 60 and 60a there are indicated dash lines which indicate that varying length members may be introduced into the upper end portion of each reactor section. For example, where it is desirable to operate the entire multiple-stage reactor system with relatively low catalyst bed units within each reactor, or within a particular reactor of the system, then depending baffle plate members 60 and 60a will be replaced with longer cylinder-from plate members to insure that the flow of the reactant stream will be radially inward, or lateral, rather than be able to by-pass through the upper portion of screen member 14 and flow over the top of the catalyst to an upper portion of screen member 15. Extended length transfer conduits 13, 21 and 38 can be used to provided for the lower height beds in each catalyst section. Intermediate flanges 21' and 38' are shown for ease interchangeability.

In connection with both FIGS. 5 and 6 of the drawing, there is indicated the utilization of a short sleeve member 63 in connection with a section of cover plate 20 at an appropriate location to accommodate the passage of catalyst transfer means 13. Although not shown in the drawing, there will, of course, be one sleeve member 63 for each depending catalyst transfer conduit 13 whereby each of the latter may be carried downwardly into each catalyst bed section. It should also be noted that while the foregoing description in connection with FIGS. 5 and 6 has been directed to the construction and arrangement for the upper portion of reactor section 2, a similar type of cover plate construction and hanging skirt construction may well be utilized in connection with each successive reactor section.

In connection with FIG. 7 of the drawing, there is indicated a typical construction such as may be utilized at the lower end portion of each reactor section whereby the contacted reactant stream is withdrawn (or introduced) from the lower end of each inner concentric screen member. For example, in connection with the lower end of reactor section 2, there will be a flange member 64 for attachment to partitioning member 22 and an elbow member 65 with an expansion joint section 66 attached to flange member 64. There is also indicated a flange member 67 at the lower end of the elbow section 65 to connect with a flanged section 68 which will be connective with outlet nozzle means 25 from chamber 1. This arrangement accommodates differential expansion which may occur between lower head or partition member 22 and the side wall portion of chamber 1 and the elimination of any expansion breakage. Also, there is shown the utilization of a sleeve member 69 through elbow section 65 in order to accommodate a catalyst transfer conduit 21 in turn connecting between the lower end of reactor section 2 and the next lower reactor section 3.

There is also indicated in connection with FIG. 7 of the drawing the utilization of a collar member 70 which extends upwardly from flange member 64 in order to provide for the central placement of inner screen member 15. Preferably, screen member 15 will be merely supported from the lower head member 22 and permitted to expand longitudinally upwardly from this support zone, as well as expanded radially a slight amount within the collar member 70. In a similar manner, the outer concentric screen member 14 will be supported from a circular ring member 71 which extends from the lower head member 22, whereby such outer screen member will expand longitudinally upwardly from this lower support zone, as well as expand radially above circular ring member 71

In FIG. 8 of the drawing, there is indicated a modified construction which may be utilized in connection with the upper end portion of chamber 1 at heat exchange zone 5, in that catalyst inlet means 7 connects with a straight, non-multi-tubular form of inner catalyst transfer section 8' that in turn connects with catalyst distribution section 11 which has outlet means 12 to join with the catalyst transfer conduits 13. The present construction and arrangement may be utilized in lieu of the arrangement at the top of FIG. 1 for those instances where catalyst is being used within each of the reactor sections for long periods of time and where there is no need to have reduction of the catalyst in the presence of hydrogen as it is being continuously introduced into the uppermost reactor section. Thus, as compared to FIG. 1 of the drawing, there is elimination of the plurality of heat exchange tubular members (such as 10) whereby the hot reactant stream from inlet nozzle 6 can pass in heat exchange therearound to effect the desired high temperature reduction and preheating of catalyst prior to reaching distribution zone 11. It will also be noted that by having the lower distribution section 11, the intermediate conduit member 8', and the upper flange member 9' removable from the interior of upper chamber 5, there can be the replaceability, when desired, of the entire section 8' by a typical tubular heat exchange section such as shown in FIG. 1 of the drawing.

Actually, various portions of the internals of the entire multiple-stage reactor system may be made in sections or pieces that may be passed through suitable man-hole means at spaced points in the vertical chamber 1. For example, although not shown, man-holes to accommodate workmen and sectionalized pieces of equipment may be provided in chamber 1 at the intermediate zones between reactor sections, as well as within upper and lower head sections for the chamber itself. Specifically, various cover plate sections such as 20, the various transfer conduit sections such as 13, 21 and 38 may be introduced or replaced by way of the various manhole means in the chamber. Still further, it will be obvious to those skilled in the construction arts that there may be minor variations in construction and arrangement with respect to any one portion of the present apparatus; however, it is not intended to limit the present invention to any one method of attachment or to any one configuration except in those instances where it has been pointed out that it is of particular advantage for an improved operation, or of specific advantage to accommodate installation and removal or to provide for temperature expasion and contraction problems.

In still another modification of the reactor system, as indicated diagrammatically in FIG. 9 of the drawing, there is shown the use of a slotted or perforated cylinder member 72 within the interior of inner screen member 15. Similar perforated plate members can be used in each of the inner screens of each reactor section in the system. The multiplicity of holes, or slotted openings, in the plate 72 are spaced uniformly and are sized to provide a predetermined area which will distribute the reactant stream through the catalyst section. In certain instances the area of the slots in the screen 15 can effect the desired control of stream distribution; however, the slots in screens 15, and in screen 14, must be sized to accommodate the size of the catalyst particles used in the system and cannot necessarily be the correct size and area to suit desired flow rates. In any event, the combination of a slotted screen and an adjacent slotted baffle plate provides a means for distributing reactant stream flow through the system. Typically, the cylindrical plate 72 will be vertically coextensive with the adjacent screen member 15.

We claim as our invention:

1. A multiple-stage catalytic reactor system for effecting the contact of a reactant stream with catalyst particles that are movable by gravity flow through said system, which comprises in combination:

(a) a vertically elongated confined chamber;
(b) at least two vertically spaced apart reactor sections in said chamber, with each such section in turn having therein concentrically spaced apart perforate screen wall members which provide an annular-form catalyst retaining section that is spaced inwardly from the wall of said chamber to additionally provide a manifold space around said section;
(c) a transverse partition below each catalyst section and each reactor section to thereby separate adjacent sections;
(d) removable cover means over the catalyst section in each of said reactor section;
(e) catalyst inlet means connective with the upper portion of said chamber and to the top of the upper annular-form catalyst section;
(f) a plurality of uniformly spaced apart and elongated catalyst transfer conduits connecting between vertically adjacent catalyst retaining sections, whereby catalyst can move by gravity flow from an elevated reactor section to a next lower section, and such conduits spaced in a circular positioning at both the upper and lower end portions of each such section that provides substantially half the catalyst retained in the adjacent vertically spaced reactor sections connected by said transfer conduits be within the inside of the circle and approximately half of the catalyst be outside of the circular positionings;
(g) a reactant stream port means at the upper end of said chamber and passageway means to the annular space around the annular catalyst section of the uppermost reactor section;
(h) additional reactant stream passageway means from the interior of each catalyst section and from below each reactor section connective with the annular manifold space around a catalyst section of a next lower reactor section; and,
(i) a plurality of uniformly spaced apart catalyst outlet means provided from the lowermost reactor section and from said chamber.

2. The reactor system of claim 1 further characterized in that said catalyst transfer conduit means are removably mounted in said system and each has a separable and removable lower end section whereby different length sections may be substituted within each overall section.

3. The reactor system of claim 1 further characterized in that an inverted conical-form baffle means is spaced above and concentric with the open inlet end of each uniformly spaced apart catalyst transfer conduit in the lower portion of each annular-form catalyst section, whereby catalyst will flow laterally and angularly from all directions into the open upper end of each such conduit to thereby provide for a generally uniform downward movement of catalyst in each annular catalyst section when catalyst is withdrawn from the bottom of the chamber.

4. The reactor system of claim 1 further characterized in that each perforate screen member of each catalyst section is formed of wedge-shaped parallel wires that have a flat face and provide resulting wedge-shape slots between adjacent wires, and both the concentric screen members have the flat faced wedge-shaped wires oriented to be in vertical positioning and facing inwardly toward the catalyst which will be retained in the annular-form section, whereby the catalyst can move downwardly along substantially smooth wall surfaces to minimize attrition.

5. The reactor system of claim 1 further characterized in that removable cylinder form baffle plate means are removably attached adjacent each concentric screen member for and within each reactor section, whereby varying length baffle means may be mounted within each reactor section to accommodate varying height catalyst beds in each annular-form catalyst section.

6. The reactor system of claim 1 further characterized in that said catalyst inlet means includes an elongated multiple tube section above the uppermost annular-form catalyst section, and means are provided to divide the catalyst flow into said catalyst system through each of the plurality of tubular means prior to distributing said catalyst uniformly into said uppermost reactor section, and said reactant stream port means at the upper end of said chamber is connected with an extended housing section at the top of said chamber that encompasses said plurality of tubular means for said catalyst, whereby there is heat exchange flow of the reactant stream in said extended section of the chamber around said tubes and the catalyst therein.

7. The reactor system of claim 1 further characterized in that each inner screen member has located therein an adjacent substantially coextensive perforated plate member having predetermined spaced open area, whereby there is distribution of the stream flow through the annular-form catalyst section.

8. The reactor system of claim 1 further characterized in that spaced radical plate support means extend between the upper end portions of said spaced apart perforate screen members and a plurality of separate removable cover plate sections are utilized between said radial support means to provide said cover means over each catalyst section.

9 The reactor system of claim 8 still further characterized in that above each radial support means and above radial edges of cover plate means there is an elongated holddown strip to extend over adjacent edge portions of said cover plates, additionally there are a plurality of vertical hoop members extending upwardly at spaced distances along the length of each of said radial support means and through openings in each of said hold-down strip means, and a tapering wedge-shaped member is utilized in combination with each such hoop member to effect the retention of each hold-down strip over said cover plates.

References Cited

UNITED STATES PATENTS

| | | | |
|---|---|---|---|
| 1,982,099 | 11/1934 | Hechenbleikner | 23—288 G X |
| 1,995,293 | 3/1935 | Clark | 23—288 G X |
| 2,317,379 | 4/1943 | Hemminger | 23—288 G X |
| 2,626,857 | 1/1953 | Crowley | 23—288 G |
| 2,726,146 | 12/1955 | Shirk | 23—288 G |
| 2,734,805 | 2/1956 | Savage et al. | 23—288 G |
| 2,745,724 | 5/1956 | Kollgaard | 23—288 G |
| 2,758,059 | 8/1956 | Berg | 208—169 X |
| 2,776,876 | 1/1957 | Bowles et al. | 23—288 G |
| 2,809,922 | 10/1957 | Berg et al. | 23—288 G X |
| 2,893,942 | 7/1959 | Berg | 23—288 G X |

BARRY S. RICHMAN, Primary Examiner

U.S. Cl. X.R.

23—288 B, 288 C, 288 H; 208—65, 140, 169, 175; 252—418